United States Patent

Bego et al.

[11] 3,903,952
[45] Sept. 9, 1975

[54] BLOW TUBE ASSEMBLY

[75] Inventors: Robert E. Bego, Bloomfield Hills; William J. Thomas; Anthony J. Voltattorni, both of Birmingham, all of Mich.

[73] Assignee: Lear Siegler, Inc., Southfield, Mich.

[22] Filed: June 22, 1973

[21] Appl. No.: 372,809

[52] U.S. Cl. .................. 164/200; 164/22; 165/142
[51] Int. Cl.² ........................................ B22C 15/24
[58] Field of Search ............ 164/200, 201, 202, 19, 164/22; 239/132.1, 132.3, 132.5, 135, 136, 137; 165/69, 142, 154; 138/114

[56] References Cited
UNITED STATES PATENTS

| | | | |
|---|---|---|---|
| 3,065,916 | 11/1962 | Kurzinski | 239/132.3 |
| 3,235,921 | 2/1966 | Bego et al. | 164/200 |
| 3,461,948 | 8/1969 | Londal et al. | 164/201 |
| 3,625,278 | 12/1971 | Bishop | 164/201 |
| 3,662,812 | 5/1972 | Godding | 164/200 |

*Primary Examiner*—Francis S. Husar
*Assistant Examiner*—John S. Brown
*Attorney, Agent, or Firm*—McGlynn and Milton

[57] ABSTRACT

A blow plate and blow tube assembly including a blow plate having a material dispensing passageway, a lower surface, a counterbore extending into the lower surface and open to the dispensing passageway, fluid circulating passages in communication with the counterbore adjacent the fluid dispensing passageway and threaded holes extending into the lower surface adjacent the counterbore. A blow tube means as disposed in the counterbore and including a central tubular member, an outer jacket member surrounding the central tubular member and secured to the central tubular member at the bottom and being spaced from the central tubular member to define a cooling fluid circulating space above the lower ends thereof. A resilient seal means is disposed in the counterbore about the upper ends of the central tubular member and the jacket member for maintaining the central tubular member and the jacket member in sealed but spaced relationship to the counterbore so that neither the central member nor the jacket member contact the blow plate. Bolts are disposed in the threaded holes in the blow plate for retaining the blow tube means in the counterbore. The resilient seal allows movement of the blow tube assembly in case of misalignment and includes a pair of passages establishing fluid communication between the fluid circulating passages in the blow plate and the fluid circulating space about the central tubular member. A tube is disposed in the fluid circulating space and has its upper end disposed in one of the passages in the seal means.

21 Claims, 4 Drawing Figures 3,903,952

BLOW TUBE ASSEMBLY

The subject invention relates to an improved blow tube assembly for use with a core-forming blow plate of the type utilized for making foundry cores of sand treated with a thermo-setting compound. The sand is blown under pressure through a material-dispensing passageway in a cool blow plate assembly and through a blow tube into a cavity in a hot core box. Because the blow tube is in contact with the hot core box, heat is transferred to the blow tube which can set up the core-making sand. Therefore, it has been common practice to include water cooling passages in the blow plate assembly in communication with a water circulating cavity in the blow tube to cool the blow tube.

One of the problems associated with many of the prior art blow tube assemblies is that the water circulating cavity in the blow tube assembly, after a period of use, plugs with calcium, etc. and, due to the construction of the blow tube assembly, there is no way to clean the water circulating cavity. Further, blow plate assemblies are counterbored in standard sizes to receive standard sized blow tube assemblies and, normally, the blow tube assembly when inserted into the counterbore in the blow plate assembly, is in metal-to-metal contact with the blow plate assembly. Consequently, corrosion frequently occurs between the blow tube and the blow plate making it very difficult to remove the blow tube from the blow plate. In addition, such metal-to-metal contact does not allow the misalignment of the blow tube. In other words, due to the metal-to-metal contact, the blow tube must be positioned very precisely so that it properly engages the core box since there is no provision for lateral or horizontal misalignment.

The subject invention relates to an improved blow tube assembly providing features not attainable with prior art blow tube assemblies and overcomes the above-mentioned disadvantages to present blow tube assemblies. This is accomplished in the subject blow tube assembly by including a resilient seal which spaces the blow tube from the blow plate assembly to prevent corrosion and to allow for misalignment or cocking of the blow tube. The blow tube assembly also incorporates a removable tube which has its upper end disposed in a passage in the seal for communicating the cooling water from the blow plate assembly to the blow tube for cooling.

Other advantages of the present invention will be readily appreciated as the same becomes better understood by reference to the following detailed description when considered in connection with the accompanying drawings wherein.

Figures 1, 2, 3, 4:
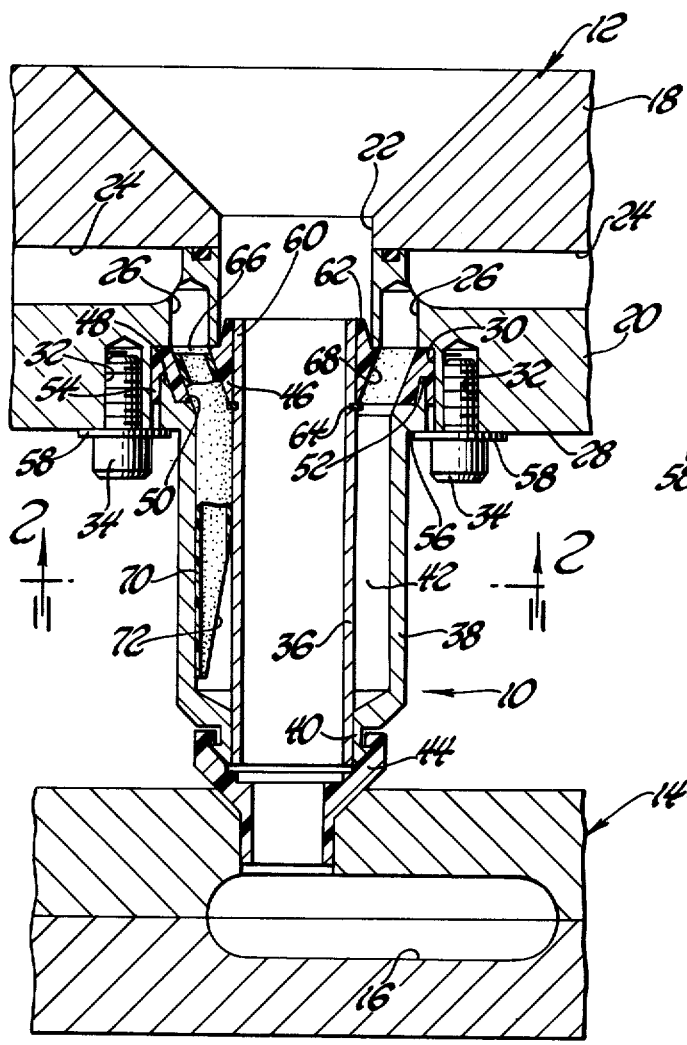
FIG. 1 is a fragmentary cross-sectional view of a blow plate assembly and a blow tube assembly shown in operative association with a core box.
FIG. 2 is a cross-sectional view taken substantially along line 2—2 of FIG. 1.
FIG. 3 is a cross-sectional view of an alternative embodiment of a blow tube assembly constructed in accordance with the instant invention.
FIG. 4 is a cross-sectional view showing yet another embodiment of a blow tube assembly constructed in accordance with the instant invention.

Referring to FIGS. 1 and 2, a blow tube assembly constructed in accordance with the instant invention is generally shown at 10. The blow tube assembly 10 is shown connected to a blow plate assembly which is generally indicated at 12. The blow tube assembly 10 is shown in operative association with a core box 14. The core box 14 includes a cavity 16 into which a core-making sand material is forced for making a sand core.

The blow plate assembly 12 includes upper and lower plates 18 and 20 respectively. The upper and lower plates 18 and 20 define a material-dispensing passageway 22 and fluid circulating passages 24. Core-making sand moves through the material-dispensing passageway 22, through the blow tube assembly 10 and into the core cavity 16. Cooling water flows through the fluid circulating passages 24 and 26 to cool the blow tube assembly 10, as will become more clear hereinafter.

The lower plate 20 includes a lower surface 28 which is counterbored at 30. The counterbore 30 is open to the material-dispensing passageway 22. The fluid circulating passages 26 are in communication with the counterbore 30 adjacent the dispensing passageway 22. Threaded holes 32 extend into the lower surface 28 adjacent the counterbore 30.

The blow tube assembly 10 is disposed in the counterbore 30 and is retained therein by the threaded bolts 34 which are threadedly disposed in the threaded holes 32.

The blow tube assembly 10 includes a central tubular member 36 and an outer jacket member 38. The outer jacket member 38 surrounds the central tubular member 36, and the central tubular member 36 and the jacket member 38 are secured in sealed relationship with one another at their lower ends, as indicated at 40. The joint 40 may be accomplished by welding, brazing, an adhesive, a press fit or any combination thereof. The jacket member 38 is spaced from the central tubular member 36 to define a fluid circulating space 42 extending upwardly from the joint 40 at the lower ends of the members 36 and 38.

A tip 44, preferably made of a heat-resistant, somewhat flexible hard rubber material or alternatively, of a suitable synthetic plastic resin such as "VITON," is disposed on the bottom of the blow tube assembly.

The blow tube assembly 10 includes a resilient seal means comprising the seal 46. The seal 46 maintains the central tubular member 36 and the outer jacket member 38 in sealed spaced relationship to the blow plate assembly 12. In other words, the members 36 and 38 are made of metal, yet they are maintained out of contact with the metal blow plate assembly 12 by the seal 46.

The upper end of the jacket member 38 is defined by an annular projection 48 which extends upwardly from a radially inwardly extending horizontal land 50. The seal 46 includes an annular recess 52 which defines an annular lip 54. The projection 48 is disposed in the recess 52 so that the annular lip 54 is disposed about the outer surface of the upper end of the jacket member 38. The exterior surface of the projection 48 defines the major periphery of the blow tube assembly 10 and extends downwardly to a radially inwardly extending shoulder 56. The exterior surface of the projection 48 is spaced by the lip 54 from the wall of the counterbore 30. Washers 58 are disposed on the bolts 34 and engage the shoulder 56 to retain the blow tube assembly 10 in the counterbore 30.

The upper end 60 of the central tubular member 36 is disposed above the projection 48 of the jacket member 38 and extends into the material-dispensing passageway 22. The seal 46 includes an annular flange 62 which extends upwardly from the upper surface of the seal and about the upper end of the central tubular member 36. A snap ring 64 is retained in a groove in the outer surface of the central tubular member 36 and engages the lower surface of the seal 46 for positioning the seal 46.

The seal 46 includes a fluid inlet passage 66 and a fluid outlet passage 68. The passages 66 and 68 are in fluid communication with the fluid passages 26 in the blow plate assembly 12.

A tube 70 has its upper end disposed in the passage 66 and extends downwardly into the fluid circulating space 42. The tube 70 is preferably made of a flexible plastic material and is disposed in frictional engagement with the central tubular member 36 and the jacket member 38. In other words, the tube 70 is forced into the fluid circulating space 42 and is held in position due to frictional engagement between the members 36 and 38 but may be readily removed for cleaning the cavity 42. The tube 70 includes an opening 72 at the bottom which is in a plane disposed at an acute angle to the longitudinal axis of the tube 70. Cooling water may flow in through the passage 66, through the tube 70, about the cavity 42 and out the passage 68 for cooling the blow tube assembly 10. Of course, the flow may be reversed whereby the fluid flows in through the passage 68, into the cavity 42, and out through the tube 70.

As noted, the seal 46 maintains the metal jacket member 38 and the metal central tubular member 36 in spaced relationship to the metal blow plate assembly 12. In this manner, corrosion between the blow tube assembly 10 and the blow plate assembly 12 is avoided and, therefore, the blow tube assembly 10 is easily removed from the counterbore 30. Furthermore, during use, the longitudinal axis of the blow tube assembly 10 need not always be perpendicular to the surface 28 as the seal 46 will give to allow some cocking or misalignment of the blow tube assembly. This misalignment is advantageous in the event that the tip 44 does not properly align with the receiving aperature in the core box 14.

The embodiment shown in FIG. 3 differs from the embodiment of FIG. 1 by employing an insert or liner 80 and an outer jacket member 38', which is at least, in part, frustoconical, as indicated at 82. The conical configuration of the outer jacket member 38' is due to a difference in the desired circulating cooling water capacity. The seal 46, shown in the embodiment of FIG. 3, is the same as the seal 46 described in the embodiment of FIG. 1. The upper ends or extremities of the embodiment of FIG. 3 are of exactly the same configuration as the upper ends or extremities of the embodiment of FIG. 1. Although not shown in FIG. 3, a tube 70 is disposed in the water circulating space between the central tubular member 36' and jacket member 38'.

The embodiment of FIG. 4 differs from the previously described embodiments by employing a liner 84 and a different tip 86. The embodiment of FIG. 4 also utilizes a tube 70' which is of a slightly different configuration than the tube 70, but which is nevertheless also frictionally held in place and is removable for cleaning. Again, however, the seal 46 is exactly the same as the previously described seals and is readily removable from the upper end of the blow tube assembly. The seal 46 is preferably a resilient plastic or rubber-like material, such as neoprene.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

We claim:

1. A blow tube assembly for use with a core-forming blow plate, said assembly comprising; a central tubular member, an outer jacket member surrounding said central tubular member, said jacket member being secured to said central tubular member at the lower ends thereof, said jacket member being spaced from said central tubular member to define a fluid circulating space above the lower ends thereof, and resilient seal means disposed about the upper end of said central tubular member and about the upper end of said jacket member for maintaining said central tubular member and said jacket member in sealed spaced relationship to a blow plate when attached thereto.

2. An assembly as set forth in claim 1 wherein said seal means includes a lip disposed about the outer surface of the upper end of said jacket.

3. An assembly as set forth in claim 2 wherein said seal includes a fluid inlet passage and a fluid outlet passage.

4. An assembly as set forth in claim 3 including a tube having its upper end disposed in one of said passages and extending downwardly into said fluid circulating space.

5. An assembly as set forth in claim 4 wherein said tube is removable.

6. An assembly as set forth in claim 4 wherein said tube is in frictional engagement with said central tubular member and said jacket member.

7. An assembly as set forth in claim 4 wherein said tube is flexible.

8. An assembly as set forth in claim 4 wherein said tube includes an opening at the bottom thereof which is in a plane disposed at an acute angle to the longitudinal axis of said tube.

9. An assembly as set forth in claim 4 wherein the upper end of said jacket member is defined by an annular projection extending upwardly from a radially inwardly extending land.

10. An assembly as set forth in claim 9 wherein said seal means includes an annular recess to define said lip, said projection being disposed in said recess.

11. An assembly as set forth in claim 10 wherein said seal means engages said land adjacent said projection.

12. An assembly as set forth in claim 11 wherein the upper end of said central tubular member is disposed above said projection on said jacket member, said seal means being disposed about the upper end of said central tubular member.

13. An assembly as set forth in claim 12 wherein said jacket member is at least in part frusto-conical.

14. A blow tube assembly for use with a core-forming blow plate, said assembly comprising; a central tubular member, an outer jacket member surrounding said central tubular member, said central tubular member defining a straight passageway open at both the top and bottom ends thereof, said jacket member being secured to said central tubular member about the open bottom end of said central tubular member, said jacket member being spaced from said central tubular member from said bottom end to the top to define an annular opening at the top of said assembly between said members and to define a fluid circulating space between said members, a tube extending downwardly into said fluid circulating space from said annular opening, said tube being flexible and in frictional engagement with said central tubular member and said jacket so as to be readily removable from said fluid circulating space.

15. An assembly as set forth in claim 14 wherein said tube includes an opening at the bottom thereof which is in a plane disposed at an acute angle to the longitudinal axis of said tube.

16. A blow plate and blow tube assembly comprising: a blow plate having a material dispensing passageway, a lower surface, a counterbore extending thereinto from said lower surface and open to said dispensing passageway, fluid circulating passages in communication with said counterbore adjacent said dispensing passageway, and at least one threaded hole extending into said lower surface adjacent said counterbore; blow tube means disposed in said counterbore and including a central tubular member, an outer jacket member surrounding said central tubular member, said jacket member being secured to said central tubular member at the lower ends thereof, said jacket member being spaced from said central tubular member to define a fluid circulating space above the lower ends thereof, and resilient seal means disposed in said counterbore and about the upper ends of said central tubular member and said jacket member for maintaining said central tubular member and said jacket member in sealed spaced relationship to said counterbore so that neither said central tubular member nor said jacket member contact said blow plate; and bolt means disposed in said threaded hole for retaining said blow tube means in said counterbore.

17. An assembly as set forth in claim 16 wherein said seal means includes passages therethrough to establish fluid communication between said fluid circulating passages in said blow plate and said fluid circulating space.

18. An assembly as set forth in claim 17 including a tube having its upper end disposed in one of said passages in said seal means and extending downwardly into said fluid circulating space.

19. An assembly as set forth in claim 18 wherein said tube is in frictional engagement with said central tubular member and said jacket member.

20. An assembly as set forth in claim 18 wherein the upper end of said jacket member is defined by an annular projection extending upwardly from a radially inwardly extending land, said seal means including an annular recess defining an annular lip, said projection being disposed in said recess so that said lip is disposed on the exterior surface of said projection and in engagement with the counterbore.

21. An assembly as set forth in claim 20 wherein said exterior surface of said projection defines the major periphery of said blow tube means and extends downwardly to a radially inwardly extending shoulder, said exterior surface being spaced from the wall of said counterbore, said bolt means being in engagement with said shoulder.

* * * * *